US009215490B2

(12) United States Patent
Won et al.

(10) Patent No.: US 9,215,490 B2
(45) Date of Patent: Dec. 15, 2015

(54) APPARATUS, SYSTEM, AND METHOD FOR CONTROLLING CONTENT PLAYBACK

(75) Inventors: Sohui Won, Sunnyvale, CA (US); Shigong Liu, Los Gatos, CA (US); Bartley Calder, San Jose, CA (US); Sathyanarayanan Nagarajan Iyer, San Jose, CA (US); Xu Cao, San Jose, CA (US); Benny Wong, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/553,071

(22) Filed: Jul. 19, 2012

(65) Prior Publication Data

US 2014/0023338 A1  Jan. 23, 2014

(51) Int. Cl.
| H04N 5/775 | (2006.01) |
| H04N 21/4223 | (2011.01) |
| H04N 21/432 | (2011.01) |
| H04N 21/44 | (2011.01) |
| H04N 21/4415 | (2011.01) |
| H04N 21/442 | (2011.01) |
| H04N 21/45 | (2011.01) |
| H04N 21/454 | (2011.01) |
| H04N 21/472 | (2011.01) |
| H04N 21/845 | (2011.01) |

(52) U.S. Cl.
CPC ....... *H04N 21/4223* (2013.01); *H04N 21/4325* (2013.01); *H04N 21/44008* (2013.01); *H04N 21/4415* (2013.01); *H04N 21/44218* (2013.01); *H04N 21/4532* (2013.01); *H04N 21/4542* (2013.01); *H04N 21/47217* (2013.01); *H04N 21/8455* (2013.01)

(58) Field of Classification Search
CPC .......... H04N 21/4223; H04N 21/4325; H04N 21/44008; H04N 21/4415; H04N 21/44218; H04N 21/4532; H04N 21/4542; H04N 21/47217; H04N 21/8455
See application file for complete search history.

(56) References Cited

U.S. PATENT DOCUMENTS

| 5,550,928 | A | 8/1996 | Lu et al. |
| 6,144,375 | A | 11/2000 | Jain et al. |
| 6,429,879 | B1 * | 8/2002 | Sturgeon et al. ............... 715/723 |
| 6,501,902 | B1 * | 12/2002 | Wang ............................ 386/240 |
| 7,650,057 | B2 | 1/2010 | Takeshita |

(Continued)

FOREIGN PATENT DOCUMENTS

| EP | 2453596 A2 | 5/2011 |
| JP | 2007-534235 A | 11/2007 |

(Continued)

OTHER PUBLICATIONS

Bulterman et al., An Architecture for Viewer-Side Enrichment of TV Content, Proceedings of the 14th Annual ACM International Conference on Multimedia, 2006, pp. 651-654, ISBN 1-59593-447-2, ACM, New York, NY, USA.

*Primary Examiner* — Tat Chio
(74) *Attorney, Agent, or Firm* — Jefferson IP Law, LLP

(57) ABSTRACT

A system and method for controlling content playback are provided. The system includes a playback device configured to display content on a display, at least one detector configured to monitor a playback area, and a controller configured to identify at least one point of interest on the content, and to operatively control the playback device according to a user input.

34 Claims, 6 Drawing Sheets

(56) References Cited

U.S. PATENT DOCUMENTS

| | | |
|---|---|---|
| 8,934,756 B2 | 1/2015 | Kuroki |
| 2002/0073417 A1 | 6/2002 | Kondo et al. |
| 2004/0104806 A1* | 6/2004 | Yui et al. .................. 340/5.74 |
| 2005/0275758 A1* | 12/2005 | McEvilly et al. ............. 348/725 |
| 2006/0174291 A1* | 8/2006 | Takai et al. ................... 725/88 |
| 2006/0285034 A1* | 12/2006 | Aratani et al. ................ 349/90 |
| 2007/0223871 A1 | 9/2007 | Thelen |
| 2007/0271580 A1 | 11/2007 | Tischer et al. |
| 2008/0022295 A1 | 1/2008 | Fukumiya et al. |
| 2009/0037945 A1 | 2/2009 | Greig et al. |
| 2009/0285545 A1 | 11/2009 | Bon |
| 2011/0154385 A1 | 6/2011 | Price et al. |
| 2012/0020641 A1 | 1/2012 | Sakaniwa et al. |
| 2012/0072936 A1 | 3/2012 | Small et al. |
| 2012/0124456 A1 | 5/2012 | Perez et al. |

FOREIGN PATENT DOCUMENTS

| | | |
|---|---|---|
| JP | 5464870 B2 | 9/2010 |
| JP | 2012-29019 A | 1/2012 |
| JP | 2012-29019 A | 2/2012 |
| KR | 10-0860641 B1 | 9/2008 |
| WO | 2009/067670 A1 | 5/2009 |
| WO | 2009/067676 A1 | 5/2009 |
| WO | 2010/111001 A2 | 9/2010 |
| WO | 2011/019775 A2 | 2/2011 |
| WO | 2011-037761 A1 | 3/2011 |

* cited by examiner

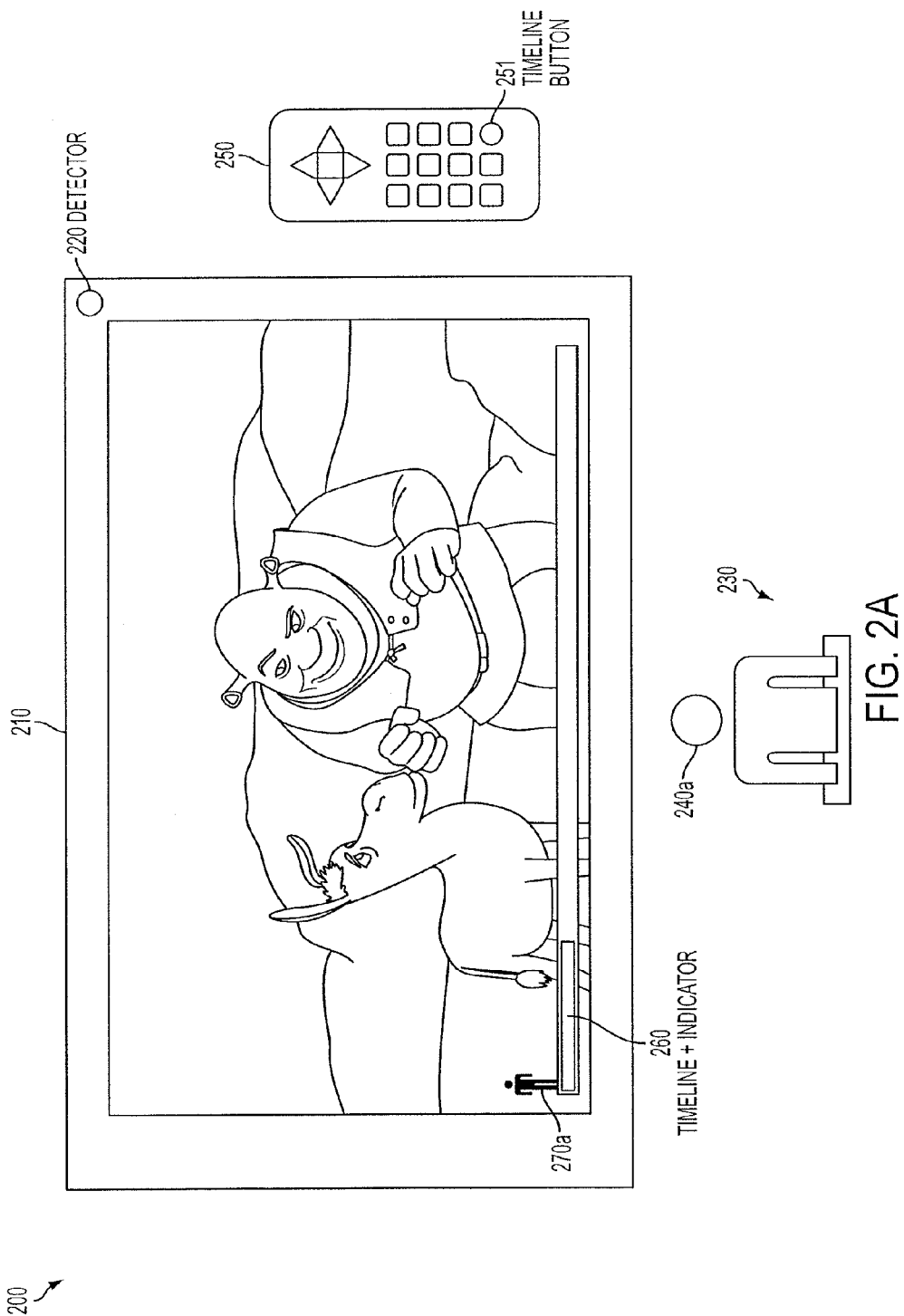

APPARATUS, SYSTEM, AND METHOD FOR CONTROLLING CONTENT PLAYBACK

BACKGROUND OF THE INVENTION

1. Field of the Invention

The present invention relates to an apparatus and a method for controlling content playback. More particularly, the present invention relates to an apparatus and a method for intelligently controlling content playback.

2. Description of the Related Art

A system for controlling content playback according to the related art monitors a viewing area to determine whether to pause or continue playback of a program based on a number of detected viewers in a viewing area. For example, a system for controlling content playback according to the related art may have a detector that detects a number of viewers in the viewing area. During playback of a program, the system for controlling content playback may periodically monitor the viewing area to detect whether there is a change in the number of viewers in the viewing area. If there is a decrease in the number of viewers in the viewing area, then the system for controlling content playback may control a playback device to pause playback of the program. When the system for controlling content playback detects an increase in the number of viewers in the viewing area such that the number of viewers in the viewing area is equal to or greater than the previously detected number of viewers in the viewing area, the system for controlling content playback controls the playback device to continue playback of the program.

According to the related art, an interactive system may be provided that allows multiple users to retrieve and consume recordings of multimedia events. In other words, according to the related art, multimedia events may be recorded and archived for user retrieval according to user queries. For example, a plurality of sensors may be configured to record a multimedia event. The sensors and other data input streams and all related metadata associated therewith may be input to an aggregator that aggregates all of the inputs associated with the multimedia event. A filtering system may be provided which provides for intelligent filtering of the inputs associated with the multimedia event to identify portions of the multimedia event that may be of interest to a user or that may be related to a user query. For example, a filtering system may identify specific portions of the multimedia event and archive those portions for creating a highlight reel or for retrieval purposes in response to user queries.

The systems and methods for controlling content playback according to the related art do not detect or monitor viewers or audience members in the viewing area and associate the data detected with a timeline of the playback content. For example, the systems and methods for controlling content playback according to the related art do not monitor an audience noise level or other behaviors, identify specific behaviors or indicia of a point of interest and associated those indicia of the point of interest with the corresponding point in time on the playback content to allow for intelligent controlling of the content playback.

Accordingly, there is a need for an apparatus and a method for intelligently controlling content playback.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a system and a method for intelligently controlling content playback In accordance with an aspect of the present invention, a system for controlling content playback is provided. The system includes a playback device configured to display content on a display, at least one detector configured to monitor a playback area, and a controller configured to identify at least one point of interest on the content, and to operatively control the playback device according to a user input.

In accordance with another aspect of the present invention, a method for controlling content playback is provided. The method includes playing content on a playback device, monitoring a playback area using at least one detector, identifying at least one point of interest of the content being played, and controlling, by a controller, playback of the content according to a user input.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 2A-2D are diagrams illustrating an apparatus for controlling content playback according to exemplary embodiments of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

For example, exemplary embodiments of the present invention will illustratively be described with regard to audio/ visual content. This system or apparatus would obviously also be applicable to strictly audio or video content, other content, or a mixture of audio or other types of content. Each of these and any other applicable systems should be understood to be within the scope of the appended claims.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include a system and a method for intelligently controlling content playback.

Figure 1:
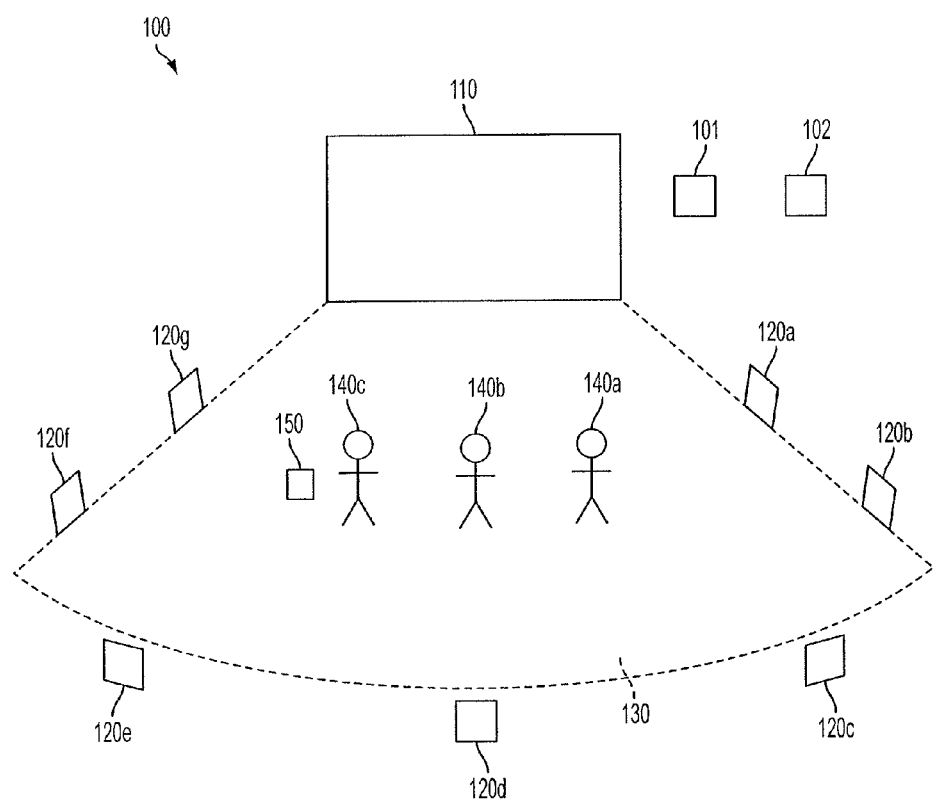
FIG. 1 is a diagram illustrating a system for controlling content playback according to an exemplary embodiment of the present invention.

FIG. 1 is a diagram illustrating a system for controlling content playback according to an exemplary embodiment of the present invention.

Referring to FIG. 1, the system for controlling content playback 100 includes a controller 101, a playback device 110, at least one detector 120a-120g, and a playback area 130.

The playback device 110 plays content for consumption by audience members 140a-140c in the playback area 130. For example, the audience members 140a, 140b, and 140c may watch or listen to the content being played by the playback device 110. According to exemplary embodiments of the present invention, the playback device 110 may be a device for displaying video content, a device for playing audio content, or a device for playing some combination of audio and video content. For example, the playback device 110 may be a television (TV), a projector, a computer, a tablet, a Set-Top Box (STB), a Personal Video Recorder (PVR), a multimedia center, and/or the like.

The at least one detector 120a-120g monitors the playback area 130. For example, according to exemplary embodiments of the present invention, the at least one detector 120a-120g monitors at least one characteristic of the playback area 130 or the audience members 140a-140c therein. The at least one detector 120a-120g may include an audio detector, a video detector, and/or the like. For example, the at least one detector 120a-120g may include infrared, optical, sonar, video, RF, and/or other suitable detectors well known in the art.

According to exemplary embodiments of the present invention, the at least one detector 120a-120g may be operatively connected to the playback device 110 and/or the controller 101. For example, the at least one detector 120a-120g may transmit data or the like as an input to at least one of the playback device 110 and the controller 101.

The controller 101 is configured to operatively control the playback device 110. For example, the controller 101 may operatively control the playback device 110 based on a user input such as, for example, an input from one of the audience members 140a-140c. According to exemplary embodiments of the present invention, the user input may be transmitted or otherwise input to the controller 101 using an input device 150. For example, the input device 150 may be a remote controller. As another example, the input device 150 may be a keyboard, a mouse, the like, and/or some combination thereof.

According to exemplary embodiments of the present invention, the controller 101 may identify at least one point of interest on the content being played. For example, the controller 101 may identify the at least one point of interest based on the data that the controller 101 receives from the at least one detector 120a-120g. The controller 101 may identify a point of interest based on a characteristic of the playback area 130 and/or a characteristic of at least one of the audience members 140a, 140b, and 140c.

According to exemplary embodiments of the present invention, the controller 101 may associate the at least one identified point of interest with a timeline of the content being played back to facilitate navigation of the content. For example, the controller 101 may store the at least one identified point of interest and its association with the timeline of the content on a storage unit 102. A user (e.g., an audience member 140a, 140b, or 140c) may selectively navigate the content being played back so as to playback the content from one of the at least one of the identified point of interest of the content. For example, each of the identified points of interest may be displayed by the playback device 110 alongside the content timeline, and the user may select a point of interest from which he/she wants to begin playback of the content. The points of interest and the content timeline may be displayed so as to be superimposed on a display of the content. As another example, each of the points of interest may be illustrated by an indicia identifying at least one characteristic of the corresponding point of interest.

According to exemplary embodiments of the present invention, the controller 101 may determine, based on an input received from the at least one detector 120a-120g, when one of the audience members 140a-140c in the playback area 130 leaves the playback area 130. Further, the controller 101 may identify a point in the content at which one of the audience members 140a-140c left the playback area 130. For example, when the audience members 140a-140c are watching a movie or other form of content, one of audience members 140a-140c may need to leave the playback area 130 for a while (e.g., to answer a phone call, to go to the bathroom, to prepare food, etc.). If the controller is able to determine the exact place in the content playback at which the audience member 140a-140c left, it is convenient for that audience member to jump to that place in the content playback to continue playback of the content.

According to exemplary embodiments of the present invention, the controller 101 may determine, based on an input received from the at least one detector 120a-120g, when a new audience member enters the playback area 130. Further, the controller may identify a point in the content at which the new audience member enters the playback area. For example, when the new audience member joins others who are watching or listening to some content, the new audience member may be interested in catching up on those portions of the content which the new audience member missed. Accordingly, the new audience member may be able to jump to any previous points in the timeline of the content being played back.

According to exemplary embodiments of the present invention, the controller 101 may also operatively control the playback device 110 based on data that the controller 101 receives from the at least one detector 120a-120g. For example, if the controller 101 determines that a new audience member enters the playback area 130, then the controller 101 may operatively switch the content currently being displayed. As an example, the system may include a parental control mode which, when enabled, ensures that the content being played is suitable for children if the controller 101 determines that a new audience member entering the playback area 130 is a child. If the audience members 140a-140c include parents who are watching or listening to adult content, then the controller 101 may automatically switch the content being displayed to content suitable for children when the controller 101 determines that a child has entered the playback area 130. In other words, based on an input received from the at least one detector 120a-120g, the controller 101 may automatically operatively switch the content being played to age appropriate content when the controller 101 determines that at least one new audience member enters the playback area 130. Moreover, the controller 101 may identify as a point of interest the point in the content timeline at which the new audience member entered the playback area 130. In other words, when a child enters the playback area 130 and the content being played is switched, the controller 101 may identify that the point in time at which the content being played is switch as a point of interest so that the original audience members may return to that point of interest for the corresponding content when the child leaves the playback area 130. Alternatively, the controller 101 may automatically return to the point of interest of the content being played when the child leaves the playback area 130.

According to exemplary embodiments of the present invention, the controller 101 may identify points of interest based on other characteristics of the playback area 130 and/or the audience members 140a-140c. For example, the controller 101 may identify a point of interest based on a behavior of the audience or of one of the audience members 140a-140c in the playback area 130. For example, the controller 101 may identify a point of interest based on a facial expression of at least one of the audience members 140a-140c. As another example, the controller 101 may identify a point of interest based on a noise level in the playback area 130. More specifically, the controller 101 may identify a point of interest based on a noise level of the audience members 140a-140c in the playback area 130. For example, if a sports event is being played by the playback device 110, then the audience members 140a-140c may cheer when a point is scored. The controller 101 may determine that the time at which a point is scored is a point of interest in the sports event based on the cheering (e.g., through the increase in noise level of the audience above a predefined threshold during the sports event). By identifying the time at which a point is scored as being a point of interest in the sports event, the audience or a new audience member may quickly view the highlights of a sports event by selecting to playback content at the identified points of interest.

According to exemplary embodiments of the present invention, a user (e.g., an audience member) may store a unique user profile. For example, such a predefined profile may be stored on the storage unit 102. The predefined profile may identify user preferences. As an example, the user preferences may relate to the types of content the user prefers, the volume or display characteristics at which the user prefers to consume content, and/or the like.

According to exemplary embodiments of the present invention, the controller 101 may determine whether the audience members 140a-140c in the playback area 130 includes the audience members 140a-140c having a predefined profile using the inputs received from the at least one detector 120a-120g. For example, the controller 101 may compare inputs received from the at least one detector 120a-120g with characteristics associated with various user profiles stored in the storage unit 102. According to exemplary embodiments of the present invention, the controller 101 may determine whether the audience members 140a-140c include the audience members 140a-140c having a predefined profile by using a characteristic detected by the at least one detector 120a-120g where the detected characteristic includes at least one of height, weight, age (or approximate age), gender, face (e.g., facial features), body shape, and/or the like.

FIGS. 2A-2D are diagrams illustrating an apparatus for controlling content playback according to exemplary embodiments of the present invention.

Referring to FIGS. 2A-2D, an apparatus for controlling content playback 200 according to exemplary embodiments of the present invention includes a playback device 210 and a detector 220. The apparatus includes a controller (not shown). For example, the controller may be integrated or otherwise installed in the playback device 210.

The playback device 210 plays content to audience members 240a-240d in the playback area 230. The playback device 210 may be configured to communicate with an input unit 250 such, as for example, a remote controller.

Features and operation of the playback device 210, the detector 220, and the controller are similar to the exemplary embodiments of the present invention described with regard to FIG. 1. Thus, for purposes of conciseness, a detailed description of such features will be omitted with reference to FIGS. 2A-2D.

Further referring to FIGS. 2A-2D, the controller may operatively control the playback device 210 to display a timeline 260 of the content being played back. According to exemplary embodiments of the present invention, the timeline 260 may be displayed so as to be superimposed on a display of the content. According to exemplary embodiments of the present invention, the controller may associate at least one identified point of interest 270a with the timeline 260. For example, with reference to FIG. 2A, an indicia of an icon relating to a person is displayed as an identified point of interest 270a alongside the timeline 260.

Figure 2B:
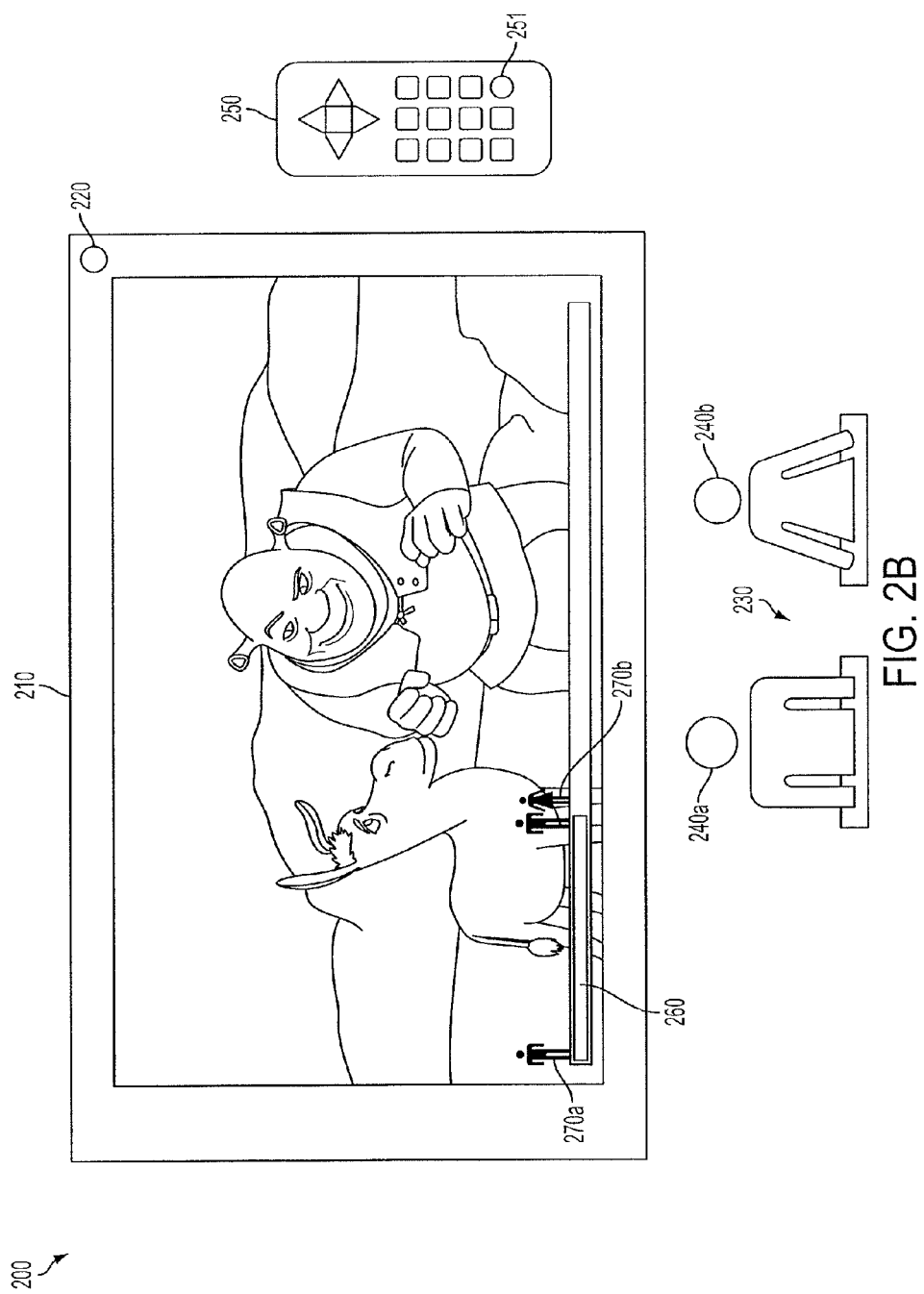

According to exemplary embodiment of the present invention, with reference to FIG. 2B, two points of interest 270a and 270b may be displayed alongside the timeline 260. The points of interest 270a and 270b may convey to the audience characteristics of the points of interest. For example, the point of interest 270a illustrates an icon showing one person (e.g., a male), and the point of interest 270b illustrates an icon showing two persons (e.g., a male and a female). Thus, for example, when the playback device 210 displays the points of interest 270a and 270b, the audience may identify the point of interest 270b as being the point at which the female audience member entered the playback area 230.

Figure 2C:
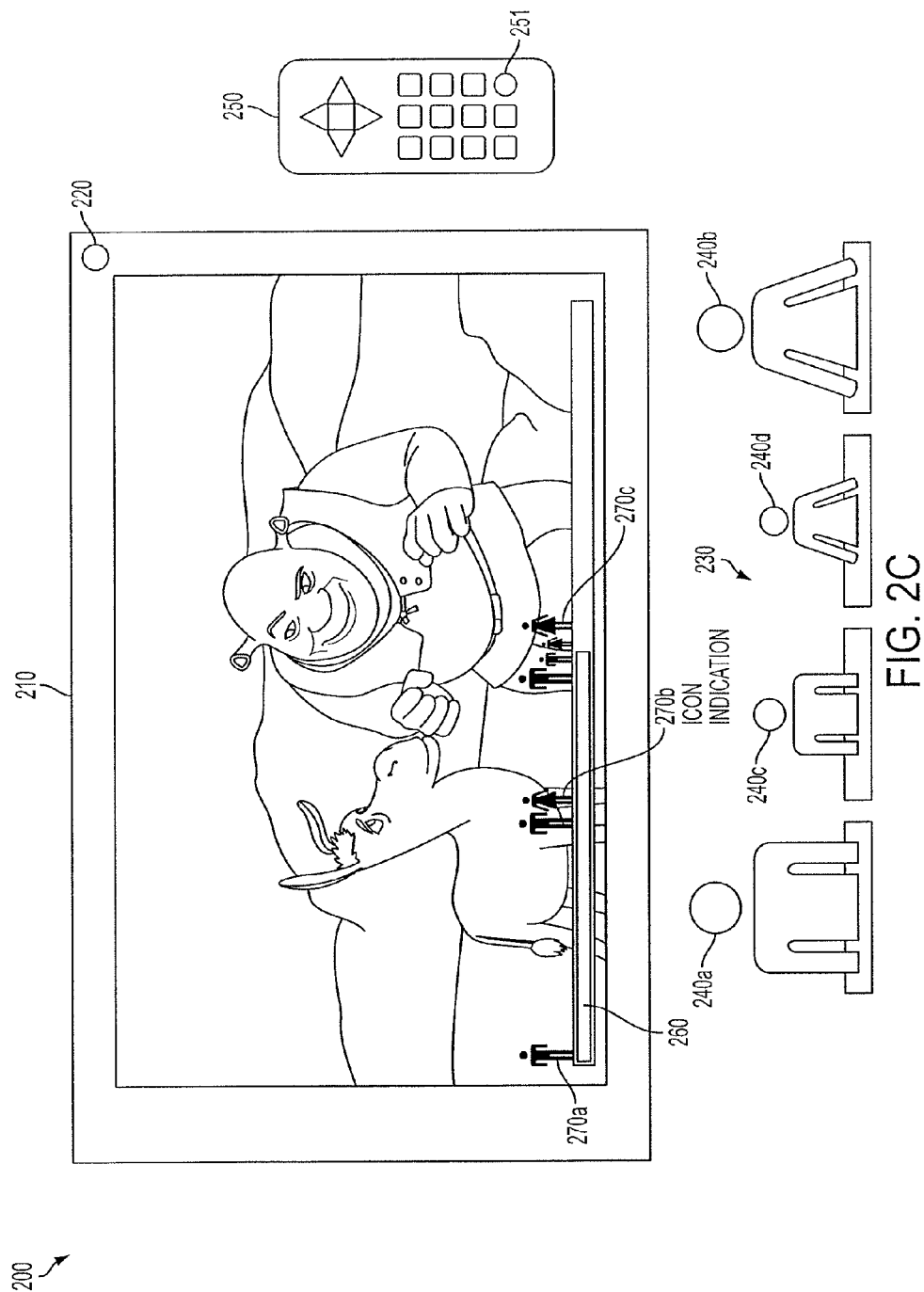
Figure 2D:
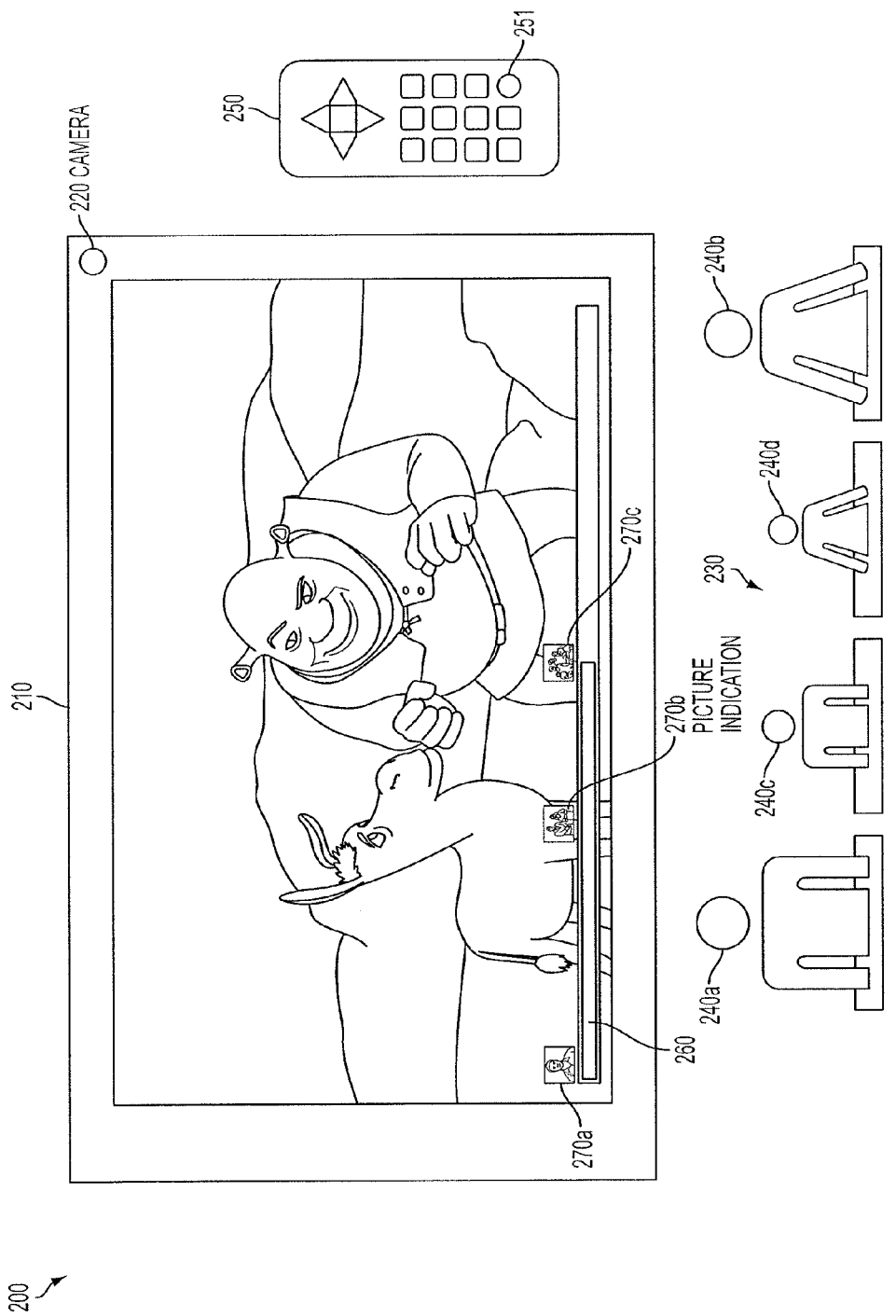

According to exemplary embodiment of the present invention, with reference to FIG. 2C, three points of interest 270a, 270b, and 270c may be displayed alongside the timeline 260. The points of interest 270a, 270b, and 270c may convey to the audience characteristics of the points of interest. For example, the point of interest 270a illustrates an icon showing one person (e.g., a male), the point of interest 270b illustrates an icon showing two persons (e.g., a male and a female), and the point of interest 270c illustrates an icon showing four persons (e.g., a male adult, a female adult, a male child, and a female child). Thus, for example, when the playback device 210 displays the points of interest 270a, 270b, and 270c, the audience may identify the point of interest 270b as being the point at which the female audience member entered the playback area 230, and may identify the point of interest 270c as being the point at which the children (e.g., the male child and the female child) entered the playback area 230.

According to exemplary embodiments, a user (e.g., an audience member) may selectively toggle between a mode in which the timeline 260 and the points of interest 270a-270c are displayed on the playback device 210 and a mode in which the timeline 260 and points of interest 270a-270c are not displayed on the playback device 210. For example, the user may toggle between the two modes by entering an input into the input unit 250. As another example, the input unit 250 may be configured to include a timeline button 251 which specifically toggles between the two modes.

According to exemplary embodiments of the present invention, points of interest may be identified by indicia including an icon, a clip art, an emoticon, a user-generated avatar, an automatically captured picture, and a picture processed with special effects. For example, FIGS. 2A-2C illustrate icons as corresponding to the points of interest 270a-270c. As another example, FIG. 2D displays a captured image (e.g., picture taken with a camera/sensor) of the playback area 230 as corresponding to the points of interest 270a-270c.

Figure 3:
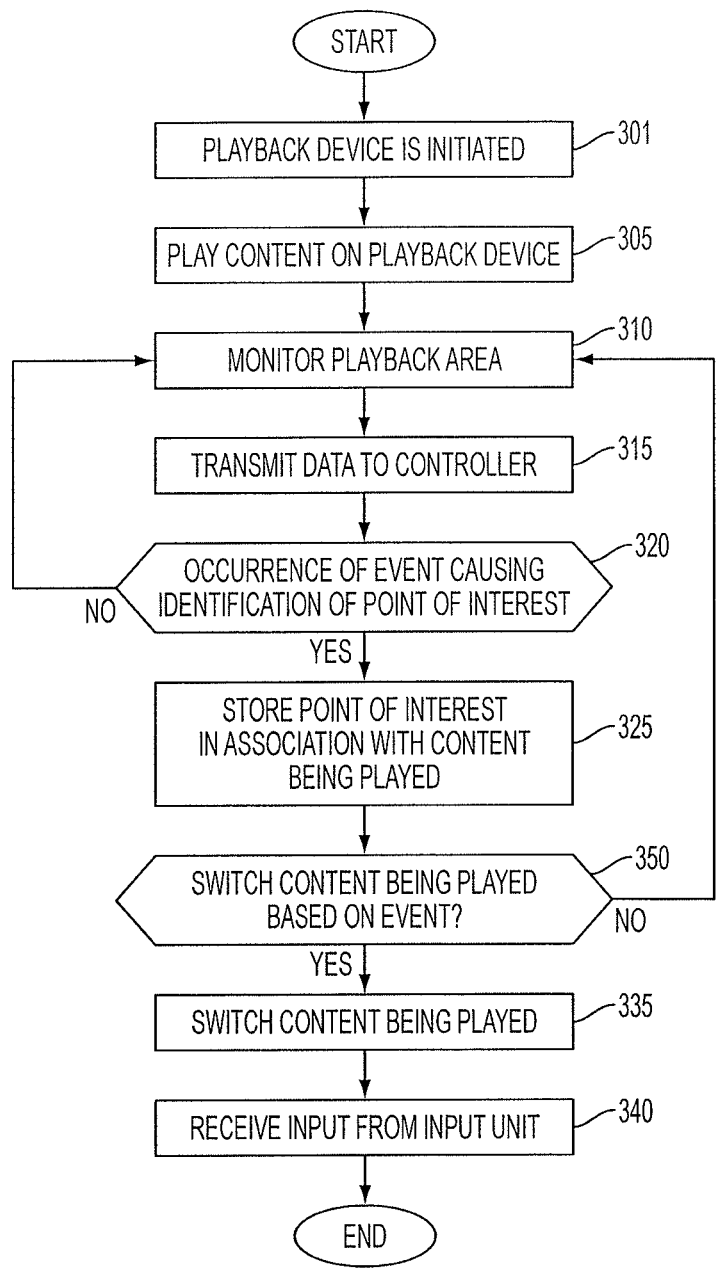
FIG. 3 illustrates a flowchart illustrating a method for controlling content playback according to an exemplary embodiment of the present invention.

FIG. 3 illustrates a flowchart illustrating a method for controlling content playback according to an exemplary embodiment of the present invention.

Referring to FIG. 3, the content playback may be intelligently controlled. For example, a method for controlling content playback may control content playback based on a user input and/or based on characteristics detected by at least one detector. In other words, the content playback may be controlled based on characteristics of the playback area and/or characteristics of the audience in the playback area.

At step 301, the playback device is initiated. Upon initiation, the playback device plays content at step 305. For example, the content may be audio content, video content, the like, or some combination thereof. In other words, the content may be a movie, a sports event, a concert, a television show, a game, and the like.

As the playback device plays the content, the at least one detector or sensor monitors the playback area at step 310. The at least one detector transmits to a controller the data generated based on such monitoring of the playback area at step 315.

At step 320, the controller determines whether the data received from the at least one detector is indicative of a point of interest and thus the occurrence of an event of potential interest to the audience. For example, according to an exemplary embodiment of the present invention, the controller may determine that an audience member left the playback area. If the controller determines that an audience member left the playback area, then the controller may identify that point in time in relation to the content as being a point of interest such that the audience member who left the playback area can later return to that point of interest to consume the content the audience member missed. As another example, the controller may determine that an audience member entered the playback area. If the controller determines that an audience member (or a new audience member) enters the playback area, then the controller may identify that point in time in relation to the content as being a point of interest such that the audience member who entered the playback area can later consume the content played prior to the audience member entered the playback area. According to an exemplary embodiment of the present invention, the controller may determine whether a specific type of audience member enters the playback area. For example, the controller may determine when an adult or a child enters the playback area.

According to an exemplary embodiment of the present invention, the controller may determine whether an audience includes an audience member having a predefined profile. For example, the controller may recognize or otherwise identify an audience member having a predefined profile based on height, weight, age (or approximate age), gender, face, body shape, and/or the like.

According to an exemplary embodiment of the present invention, the controller may identify a point of interest based on the characteristics of the playback area and/or the audience members. For example, the controller may identify a point of interest based on the noise level detected. As another example, the controller may identify a point of interest based on a facial expression of an audience member.

If the controller identifies a point of interest, at step 325, the controller may store the point of interest in association with the content being played.

If the controller does not identify a point of interest based on the data transmitted to the controller from the at least one detector, the method of controlling content playback returns to step 310 at which the at least one detector monitors the playback area.

At step 330, the controller determines whether the content being played by the playback device should be switched based on detected event indicative of a point of interest. For example, if the playback device is displaying adult content and the controller determines that a child entered the playback area, then the controller may control the playback device to switch the content being played to age appropriate content (e.g., content suitable for a child). According to an exemplary embodiment of the present invention, a parental control mode may be operated such that the controller automatically operatively switches the content being played to age appropriate content if adult content is being played when a child enters the playback area. As another example, if the controller determines that the audience includes an audience member having a predefined profile, then the controller may recommend content for playback based on the corresponding audience member's predefined profile.

If the controller determines that the content being played does not need to be switched, then the method for controlling content playback returns to step 310 at which the at least one detector monitors the playback area.

If the controller determines that the content being played should be switched based on the detected event, then, at step 335, the controller operatively switches the content being played.

At step 340, the controller receives an input from an input unit. For example, the input may correspond to selection of content to be played by the playback device. As another example, the input may correspond to selection of a point of interest associated with the content being displayed. Each of the identified points of interest may be displayed alongside a timeline of the content. The points of interest and the timeline may be displayed so as to be superimposed on the content being played. The points of interest may be displayed as indicia alongside the timeline. According to exemplary embodiments of the present invention, the indicia may be an icon, a clip art, an emoticon, a user-generated avatar, an automatically captured picture, and a picture processed with special effects.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A system for controlling content playback, the system comprising:
  a playback device configured to display content on a display;
  at least one detector configured to monitor a spatial playback area including one or more audience members; and
  a controller configured to set at least one point of interest on the content according to a monitoring result of the monitoring of the spatial playback area, to operatively control the playback device according to a user input, and to operatively switch content being played when the controller determines that at least one new audience member enters the spatial playback area, wherein the controller sets one or more point of interests on the content in response to detecting that at least one of the audience members exited the spatial playback area.

2. The system of claim 1, wherein the controller is configured to operatively control the playback device so as to playback the content from one of the at least one of the set point of interest based on the user input.

3. The system of claim 2, further comprising:
a storage unit for storing the content and data associated with the at least one point of interest set by the controller.

4. The system of claim 2, wherein the controller is further configured to determine, based on an input received from the at least one detector, when an audience member in the spatial playback area leaves the spatial playback area, and to set a point in the content at which the audience member left the spatial playback area.

5. The system of claim 2, wherein the controller is further configured to determine, based on an input received from the at least one detector, when a new audience member enters the spatial playback area, and to set a point in the content at which the new audience member entered the spatial playback area.

6. The system of claim 1, wherein, based on the user input, the system may be operated in a parental control mode such that the controller operatively switches content being played to age appropriate content when the controller determines that at least one new audience member enters the spatial playback area.

7. The system of claim 6, wherein the controller is further configured to determine, based on an input received from the at least one detector, when a child enters the spatial playback area, and to operatively switch the content being played to content suitable for children when the child enters the spatial playback area.

8. The system of claim 7, wherein the controller is further configured to set a point in the content at which the controller operatively switched the content being played such that the controller can control playback of the content from the point in the content based on the user input.

9. The system of claim 2, wherein the controller sets a point of interest based on behavior of an audience in the spatial playback area.

10. The system of claim 9, wherein the controller sets a point of interest based on the noise level of the audience in the spatial playback area.

11. The system of claim 2, further comprising:
an input unit;
wherein the controller operatively controls the playback device to display the at least one set point of interest on a content timeline, and
wherein the controller is further configured to control playback of the content from one of the at least one set point of interest based on the user input received from the input unit.

12. The system of claim 11, wherein the playback device displays each of the at least one set point of interest on the content timeline using at least one indicia of at least one characteristic associated with the at least one set point of interest.

13. The system of claim 12, wherein the indicia is at least one of an icon, a clip art, an emoticon, a user-generated avatar, an automatically captured picture, and a picture processed with special effects.

14. The system of claim 1, wherein controller is further configured to determine, based on an input from the at least one detector, whether an audience in the spatial playback area comprises a member having a predefined profile.

15. The system of claim 14, wherein the controller is further configured to recommend content based on the predefined profile of at least one member in the audience.

16. The system of claim 14, wherein the controller determines whether the audience in the spatial playback area comprises the member having the predefined profile based on a detected characteristic of the member, and
wherein the detected characteristic of the member comprises at least one of a height, a weight, an age, a gender, a face, and a body shape.

17. The system of claim 2, wherein the controller is further configured to detect a facial expression of a member of an audience in the spatial playback area, and
wherein the controller sets at least one point of interest based on the detected facial expression.

18. A method for controlling content playback, the method comprising:
playing content on a playback device;
monitoring a spatial playback area using at least one detector;
setting at least one point of interest of the content being played according to a monitoring result of the monitoring of the spatial playback area;
controlling, by a controller, playback of the content according to a user input; and
operatively switching content being played when the controller determines that at least one new audience member enters the spatial playback area,
wherein the controller sets one or more point of interests on the content in response to detecting that at least one of the audience members exited the spatial playback area.

19. The method of claim 18, wherein the playing of the content is controlled by the controller so as to playback the content from at least one of the set point of interest based on user input.

20. The method of claim 19, further comprising:
storing the content and data associated with the at least one set point of interest on a storage unit.

21. The method of claim 19, further comprising:
determining, by the controller, based on the monitoring of the spatial playback area, when an audience member in the spatial playback area leaves the spatial playback area,
wherein the setting at least one point of interest of the content being played comprises setting a point in the content at which the audience member left the spatial playback area.

22. The method of claim 19, further comprising:
determining, by the controller, based on the monitoring of the spatial playback area, when a new audience member enters the spatial playback area,
wherein the setting at least one point of interest of the content being played comprises setting a point in the content at which the new audience member entered the spatial playback area.

23. The method of claim 18, wherein the playback device plays the content in parental control mode based on the user input such that the content being played is switched to age appropriate content when at least one new audience member is determined to enter the spatial playback area.

24. The method of claim 23, wherein the content played by the playback device is switched to content suitable for children when a child is determined to enter the playback based on the monitoring of the spatial playback area.

25. The method of claim 24, wherein the setting of the at least one point of interest comprises setting a point in the content at which the content being played by the playback device is switched such that playback of the content may be performed from the point in the content based on the user input.

26. The method of claim 19, wherein the setting of the at least one point of interest setting a point of interest based on behavior of an audience in the spatial playback area.

27. The method of claim 26, wherein the setting of the point of interest comprises setting a point of interest based on the noise level of the audience in the spatial playback area.

28. The method of claim 19, further comprising:
receiving the user input from an input unit;
wherein playback of the content is controlled so as to playback from one of the at least one set point of interest based on the user input.

29. The method of claim 28, further comprising:
displaying each of the at least one set point of interest on the content timeline using at least one indicia of at least one characteristic associated with the at least one set point of interest.

30. The method of claim 29, wherein the indicia is at least one of an icon, a clip art, an emoticon, a user-generated avatar, an automatically captured picture, and a picture processed with special effects.

31. The method of claim 18, further comprising:
determining, by the controller, based on an input from the at least one detector, whether an audience in the spatial playback area comprises a member having a predefined profile.

32. The method of claim 31, further comprising:
recommending, by the controller, content based on the predefined profile of at least one member in the audience.

33. The method of claim 31, further comprising:
determining, by the controller, whether the audience in the spatial playback area comprises the member having the predefined profile based on a detected characteristic of the member,
wherein the detected characteristic of the member comprises at least one of a height, a weight, an age, a gender, a face, and a body shape.

34. The method of claim 19, wherein the monitoring of the spatial playback area comprises detecting a facial expression of a member of an audience in the spatial playback area, and
wherein the setting at least one point of interest of the content being played comprises setting at least one point of interest based on the detected facial expression.

* * * * *